US011044109B2

(12) United States Patent
Main et al.

(10) Patent No.: US 11,044,109 B2
(45) Date of Patent: Jun. 22, 2021

(54) UTILIZING A DATA CABLE INFRASTRUCTURE TO PROVIDE POWER

(71) Applicant: HEWLETT-PACKARD DEVELOPMENT COMPANY, L.P., Houston, TX (US)

(72) Inventors: John Michael Main, Fort Collins, CO (US); David H. Hanes, Fort Collins, CO (US); Matthew Flach, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 374 days.

(21) Appl. No.: 15/764,931

(22) PCT Filed: Sep. 30, 2015

(86) PCT No.: PCT/US2015/053271
§ 371 (c)(1),
(2) Date: Mar. 30, 2018

(87) PCT Pub. No.: WO2017/058210
PCT Pub. Date: Apr. 6, 2017

(65) Prior Publication Data
US 2018/0287807 A1  Oct. 4, 2018

(51) Int. Cl.
*H04L 12/10* (2006.01)
*H01B 9/00* (2006.01)
(52) U.S. Cl.
CPC ............. *H04L 12/10* (2013.01); *H01B 9/003* (2013.01)

(58) Field of Classification Search
CPC ................................ H04L 12/10; H01B 9/003
See application file for complete search history.

(56) References Cited

U.S. PATENT DOCUMENTS

| 5,956,385 | A  | * | 9/1999 | Soto | H04M 1/24 |
|---|---|---|---|---|---|
|  |  |  |  |  | 379/21 |
| 6,433,672 | B1 |  | 8/2002 | Shirmard |  |
| 6,658,108 | B1 | * | 12/2003 | Bissell | H04L 12/66 |
|  |  |  |  |  | 379/102.04 |
| 7,099,707 | B2 |  | 8/2006 | Amin et al. |  |
| 7,295,655 | B2 | * | 11/2007 | Harrison | H04M 3/08 |
|  |  |  |  |  | 379/1.01 |
| 7,499,539 | B2 |  | 3/2009 | Barrese et al. |  |
| 7,672,448 | B2 |  | 3/2010 | Schley-May et al. |  |

(Continued)

FOREIGN PATENT DOCUMENTS

JP          2008529463 A      7/2008

OTHER PUBLICATIONS

"Land Line Telephone Troubleshooting for the Homeowner", Jul. 1, 2002.

*Primary Examiner* — Daniel Kessie
(74) *Attorney, Agent, or Firm* — Fabian VanCott

(57) ABSTRACT

Utilizing a data cable infrastructure to provide power includes a detector to determine whether data cables in the data cable infrastructure are being used by a data service provider, a circuit to determine an amount of power that can be provided on each of a number of wires within the data cables, and an adjustable power supply of a power system to selectively provide power over the wires within the data cables in the amount determined by the circuit and based on whether the detector determines the data cables to be in use by the data service provider.

17 Claims, 5 Drawing Sheets

(56) References Cited

U.S. PATENT DOCUMENTS

| | | | |
|---|---|---|---|
| 2003/0016814 A1* | 1/2003 | Fredrickson | H04M 1/76 |
| | | | 379/387.01 |
| 2004/0049321 A1 | 3/2004 | Lehr et al. | |
| 2010/0017631 A1 | 1/2010 | Karam | |
| 2010/0080367 A1 | 4/2010 | Miskin | |
| 2013/0187632 A1 | 7/2013 | Ohana | |
| 2014/0293994 A1 | 10/2014 | Pepe et al. | |
| 2017/0102422 A1* | 4/2017 | Van Endert | G01B 7/02 |

* cited by examiner

UTILIZING A DATA CABLE INFRASTRUCTURE TO PROVIDE POWER

BACKGROUND

A building, such as an apartment, a townhouse, a residential house, or a commercial building often includes a data cable infrastructure. The data cable infrastructure may be a number of data cables and jacks wired together as a network throughout the building. A data service provider may provide telecommunications services, internet services, and video and audio services to devices connected to the data cable infrastructure.

BRIEF DESCRIPTION OF THE DRAWINGS

The accompanying drawings illustrate various examples of the principles described herein and are a part of the specification. The examples do not limit the scope of the claims.

Throughout the drawings, identical reference numbers designate similar, but not necessarily identical, elements.

DETAILED DESCRIPTION

Figure 1A:
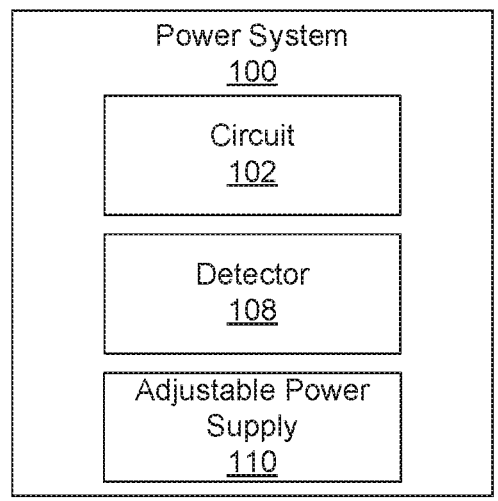
FIG. 1A is a diagram of a power system, according to one example of principles described herein.

As mentioned above, the data cable infrastructure may include a number of data cables and jacks wired together as a network throughout the building. The jacks may be connected to each other via wires within the data cables. Once the data cable infrastructure is connected to the data service provider via at least one of the jacks, the data service provider may provide telecommunications services, internet services, and video and audio services via the data cable infrastructure in the building. A user may then connect an electronic device such as a telephone, a cable box, or a router to at least one of the jacks to use these services provided by the data service provider. This allows communications to be exchanged via the data cable infrastructure in the building as well as other locations.

As technology advances, the data cable infrastructure in the building may become obsolete. For example, with the advancement in cellular phone technology, a data cable infrastructure that provides wired phone lines and jacks may become obsolete. Because the data cable infrastructure may become obsolete, the owner of the building may decide to remove the data cable infrastructure from the building. This can become very costly when the data cable infrastructure includes several data cables and jacks. Alternatively, the owner of the building may decide to leave the data cable infrastructure intact in the building. As a result, the building may include a useless data cable infrastructure.

The principles described herein include a system and a method for utilizing an existing data cable infrastructure to provide power. Such a system and method include a detector to determine whether data cables in the existing data cable infrastructure are being used by a data service provider, a circuit to determine an amount of power that can be provided on each of a number of wires within the data cables, and with an adjustable power supply of a power system to selectively provide power over the wires within the data cables in the amount determined by the circuit and based on whether the detector determines the data cables to be in use by the data service provider. Such a system and method repurposes the existing data cable infrastructure such that the existing data cable infrastructure may provide power to the jacks of the existing data cable infrastructure and the jacks may act as power outlets. As a result, electronic devices such as laptops, tablets, cellular phones, and other mobile devices that are connected to the jacks may be operated and/or charged via the existing data cable infrastructure.

In the present specification and in the appended claims, the term "data service provider" means a company that provides a user or an organization with telecommunications services. The data service provider may be a telephone service provider, an internet service provider, an audio and video service provider, other service providers, or combinations thereof.

In the present specification and in the appended claims, the term "existing data cable infrastructure" means existing data cables and jacks wired together in a network, for example, within a building or building complex. The jacks may be connected to each other via wires within the data cables. The existing data cable infrastructure may be located in a commercial building. The existing data cable infrastructure may be located in a residential building.

In the present specification and in the appended claims, the term "jack" means a standardized telecommunications network interface for connecting voice and data equipment to a data service provider. A jack may be a primary jack that connects a power system to the existing data cable infrastructure. A jack may be a secondary jack that is connected to a primary jack.

In the present specification and in the appended claims, the term "data cable" means a line used to bear electric loads and signals between two points. The data cable may be a telecommunications cable, a coaxial cable, an Ethernet cable, other data cables, or combinations thereof. The data cable may include a number of wires. The wires may be of different sizes, capacities or gauges.

In the present specification and in the appended claims, the term "power system" means a mechanism used to provide power to an existing data cable infrastructure. The power system may include a number of electrical components such as a detector to detect when an existing data cable infrastructure is disconnected from a service provider and an adjustable power supply to adjust an amount of power that can be selectively provided to the cable infrastructure.

Further, as used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Referring now to the figures, FIG. 1A is a diagram of a power system, according to one example of principles described herein. As will be described below, a power system includes a detector to determine whether data cables in an existing data cable infrastructure are being used by a data service provider. The power system includes a circuit to determine an amount of power that can be provided on each of a number of wires within the data cables.

As illustrated, the diagram includes a power system (100). The power system (100) is a mechanism used to provide power to an existing data cable infrastructure. As will be described in this specification, the power system (100) may safely provide power to an existing data cable infrastructure. This may include ensuring not to overload the existing data cable infrastructure with excessive power such that wires in the data cables do not heat up and/or catch fire. This may also include not damaging equipment associated with a data service provider.

As illustrated, the power system (100) includes a detector (108). The detector (108) may be used to determine whether data cables in the existing data cable infrastructure are being used by a data service provider. The detector (108) may be a combination of hardware and software designed to perform a designated function. The detector (108) may be in communication with a processor and memory to aid the detector (108) in executing the designed function.

In some examples, the detector (108) detects the presence of a dial tone to determine whether data cables in the existing data cable infrastructure are being used by a data service provider. To detect the presence of the dial tone on the data cables, the power system (100) is connected directly to the data cables via a jack. The detector (108) may analyze any electrical signals detected on the data cables for specific frequencies. For example, a typical dial tone may include a 350 hertz (Hz) frequency and a 440 Hz frequency. If any of these frequencies are detected on the data cables, the detector (108) determines the existing data cable infrastructure is being used by a data service provider. As a result, the detector (108) may indicate that the power system may not supply power to the existing data cable infrastructure. Since the detector (108) determined the data service provider was connected to the existing data cable infrastructure, power will not be supplied via the power system (100) to the existing data cable infrastructure to avoid damaging equipment associated with a data service provider.

Alternatively, if the detector (108) cannot detect the presence of these frequencies on the data cables, the detector (108) may determine that the existing data cable infrastructure is not being used by a data service provider. As a result, the detector (108) may indicate that the power system (100) may be used to supply power to the existing data cable infrastructure. More information about the detector (108) will be described in other parts of this specification.

While this example has been described with reference to the detector (108) determining if the existing data cable infrastructure is being used by a data service provider via the presence of a dial tone, other methods may be used by the detector (108). As will be described below, these methods includes the detector (108) detecting a voltage, a current, or a signal on the existing data cable infrastructure.

As illustrated, the power system (100) includes a circuit (102). The circuit (102) may be used to determine an amount of power that can be provided on each of a number of wires within the data cables. The circuit (102) may be a combination of hardware and software designed to perform a designated function. The circuit (102) may be in communication with a processor and memory to aid the circuit (102) in executing the designed function. As will be described in other parts of this specification, the circuit (102) may determine how much current and/or voltage may be provided to each of the wires with the data cables of the existing data cable infrastructure. This ensures the existing data cable infrastructure is not overloaded with excessive power such that the wires in the data cables do not heat up and/or catch fire.

In an example, if the circuit (102) determines a data cable includes two pairs of wires of different gauges, the circuit (102) may determine, for example, 5 volts (V) may be provided on the first pair of wires. The circuit (102) may determine that 15 V may be provided on the second pair of wires. More information about the circuit (102) will be described in other parts of this specification.

As illustrated, the power system (100) includes an adjustable power supply (110). The adjustable power supply (110) of the power system (100) may be used to selectively provide power over the wires within the data cables in the amount determined by the circuit (102) and based on whether the detector (108) determines the data cables to be in use by the data service provider. For example, if the detector (108) determines the data cables are not in use by the data service provider, the power system (100) may selectively provide, via the adjustable power supply (110), the amount of power the wires within the data cables in the amount determined by the circuit (102). In keeping with the example, if the circuit (102) determined 5V may be provided on the first pair of wires of the data cable, the power system (100) provides, via the adjustable power supply (110), 5V to the first pair of wires. If the circuit (102) determined 15V may be provided on the second pair of wires of the data cable, the power system (100) provides, via the adjustable power supply (110), 15V to the second pair of wires. As a result, the existing data cable infrastructure may be repurposed such that the power system (100) may provide power to the existing data cable infrastructure. This allows electronic devices such as laptops, tablets, cellular phones, and other mobile devices to be connected to the existing data cable infrastructure via jacks. Once connected, the electronic devices may be charged via the existing data cable infrastructure. More information about the power system (100) will be described later on in this specification.

Figure 1B:
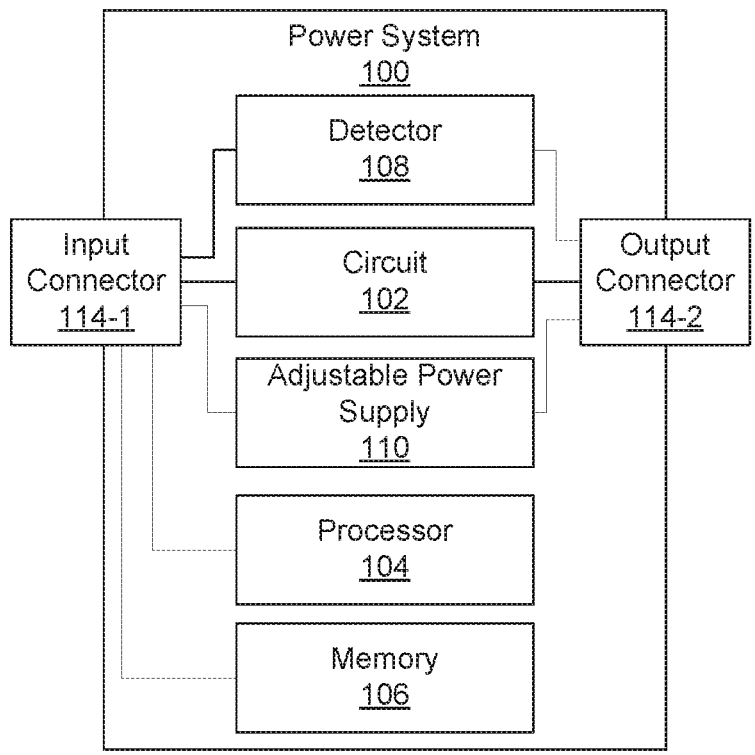
FIG. 1B is a diagram of a power system, according to one example of principles described herein.

FIG. 1B is a diagram of a power system, according to one example of principles described herein. As will be described below, a power system includes a number of connectors to connect the power system to a power source and/or the existing data cable infrastructure. The power system includes a detector to determine whether data cables in an existing data cable infrastructure are being used by a data service provider. The power system includes a circuit to determine an amount of power that can be provided on each of a number of wires within the data cables. The power system includes an adjustable power supply to selectively provide the power to the wires within the data cables.

As illustrated the power system (100) includes an input connector (114-1). The input connector (114-1) may be utilized for receiving power from a power source. As will be described in other parts of this specification the power source may be a mechanism to provide power to components of the power system (100). The power source may be a battery, an electric outlet, a solar panel, other power sources, or combinations thereof. The type of power source may be an alternating current (AC) power source or a direct current (DC) power source. The power source may produce a high voltage and/or current. The power source may produce a low voltage and/or current.

Because the type of power source may vary, the input connector (114-1) may include several styles of input connectors such that several types of power sources may be connected to the input connector (114-1). For example, if the power source is a DC power source, the input connector (114-1) may include a connector that connects the positive terminal of the DC power source to a positive terminal of the input connector (114-1). The input connector (114-1) may include a mechanism that connects the negative terminal of the DC power source to a negative terminal of the input connector (114-1).

In another example, if the power source is an AC power source, the input connector (114-1) may include a mechanism that connects the hot terminal of the AC power source to a hot terminal of the input connector (114-1). The input connector (114-1) may include a mechanism that connects the neutral terminal of the AC power source to a neutral terminal of the input connector (114-1). The input connector (114-1) may include a mechanism that connects the ground terminal of the AC power source to a ground terminal of the input connector (114-1). As a result, the input connector (114-1) may accommodate the various types of power sources.

The power system (100) further includes a processor (104) and memory (106). The memory (106) is communicatively coupled to the processor (104). The memory (106) refers to program instructions for performing a designated function. The memory (106) causes the processor (104) to execute the designated function. In some example, the memory (106) may include a number of look up tables. One of the look up tables may include entries that define amounts of power that can be supplied to the existing data cable infrastructure based on the gauge of wires in the data cables. For example, an entry in the look up table may indicate that 5V can be supplied to a 24 gauge wire. Another look up table may include entries that define resistances associated with gauges of a wire. For example, an entry in this look up table may indicate that a 24 gauge wire has 23 ohms of resistance per 1000 feet. As will be described below, the look up tables may aid components such as the detector (108) and the circuit (102) to perform their designated functions.

In some examples, the memory (106) and the processor (104) may be in communication with the detector (108) to aid the detector (108) to determine whether the data cables in the existing data cable infrastructure are being used by a data service provider. For example, the memory (106) and the processor (104) may utilize information from the detector (108) to determine whether the data cables in the existing data cable infrastructure are being used by a data service provider. As will be described below, the detector (108) may produce a high signal or a low signal depending whether the data cables in the existing data cable infrastructure are being used by a data service provider or not. For example, if the detector (108) detects a voltage or a dial tone on the existing data cable infrastructure, the detector (108) may send a high signal to the memory (106) and the processor (104). The memory (106) and the processor (104) may receive and process the high signal and determine the data cables in the existing data cable infrastructure are being used by a data service provider. Alternatively, if the detector (108) does not detect a voltage or a dial tone on the existing data cable infrastructure, the detector (108) may send a low signal to the memory (106) and the processor (104). The memory (106) and the processor (104) may receive and process the low signal and determine the data cables in the existing data cable infrastructure are not being used by a data service provider.

Further, the detector (108) may be connected to the input connector (114-1) to receive power from the power source. This provides the detector (108) with enough power to execute its intended function. Although not illustrated, electrical components may be placed between the input connector (114-1) and the detector (108) such that an appropriate amount of power is supplied to the detector (108). The electrical components may include diodes, capacitors, resistors, a transformer, a power supply, other electrical components, or combinations thereof. For example, if 10V is needed to power the detector (108), electrical components may be designed such that the power received by the input connector (114-1) is modified to 10V when received by the detector (108). Further, the detector may be connected to the output connector (114-2) to determine whether the data cables in the existing data cable infrastructure are being used by a data service provider as described above.

As mentioned above, a circuit (102) determines an amount of the power that can be provided on each of a number of wires within the data cables. In some examples the memory (106) and the processor (104) and the circuit (102) are in direct communication with each other. Further, the memory (106) and the processor (104) may process and execute signals received by the circuit (102). For example, a signal may indicate each of the wires in the data cables are 24 gauge. An entry in the look up table in the memory (106) may indicate that 5V can be supplied to a 24 gauge wire. This information is communicated back to the circuit (102). As a result, the circuit (102) determines 5V can be provided on each of a number of wires within the data cables.

Further, the circuit (102) may be connected to the input connector (114-1) to receive power from the power source. This provides the circuit (102) with enough power to execute its intended function. Although not illustrated, electrical components may be placed between the input connector (114-1) and the circuit (102) such that an appropriate amount of power is supplied to the circuit (102). The electrical components may include diodes, capacitors, resistors, a transformer, a power supply, other electrical components, or combinations thereof. For example, if 10V is needed to power the circuit (102), electrical components may be designed such that the power received by the input connector (114-1) is modified to 10V when received by the circuit (102). Further, the detector may be connected to the output connector (114-2) to determine an amount of the power that can be provided on each of a number of wires within the data cables. More information about the circuit (102) will be described in other parts of this specification.

As illustrated, the power system (100) includes an adjustable power supply (110). The adjustable power supply (110) selectively provides the power over the wires within the data cables in the amount determined by the circuit (102) and based on whether the detector (108) determines the data cables to be in use by the data service provider. In some examples, the amount of the power that is selectively provided to the wires of the data cables via the power system (100) is customizable. For example, if each of the wires within the data cable is capable of distributing 5V, the power system (100) provides 5V to the existing data cable infrastructure. In another example, if the data cable includes four wires and the circuit (102) determines two of the wires are capable of distributing 5V and the other two wires are capable of distributing 15V, the power system (100) provides 5V and 15V to the wires with in the data cable respectively.

Further, the adjustable power supply (110) may be connected to the input connector (114-1) to receive power from the power source. This provides the adjustable power supply (110) with enough power to execute its intended function. Although not illustrated, electrical components may be placed between the input connector (114-1) and the adjustable power supply (110) such that an appropriate amount of power is supplied to the adjustable power supply (110). The electrical components may include diodes, capacitors, resistors, a transformer, a power supply, other electrical components, or combinations thereof. For example, if 10V is needed to by the adjustable power supply (110), electrical components may be designed such that the power received by the input connector (114-1) is modified to 10V when received by adjustable power supply (110). Further, the adjustable power supply (110) may be connected to the output connector (114-2) to supply the amount of power to the data cables in the existing data cable infrastructure.

As will be described in other parts of this specification, the power system (100) provides the amount of the power to a primary jack via the output connector (114-2). The primary jack distributes the amount of the power to each of the secondary jacks via the wires within the data cables.

Figure 2:
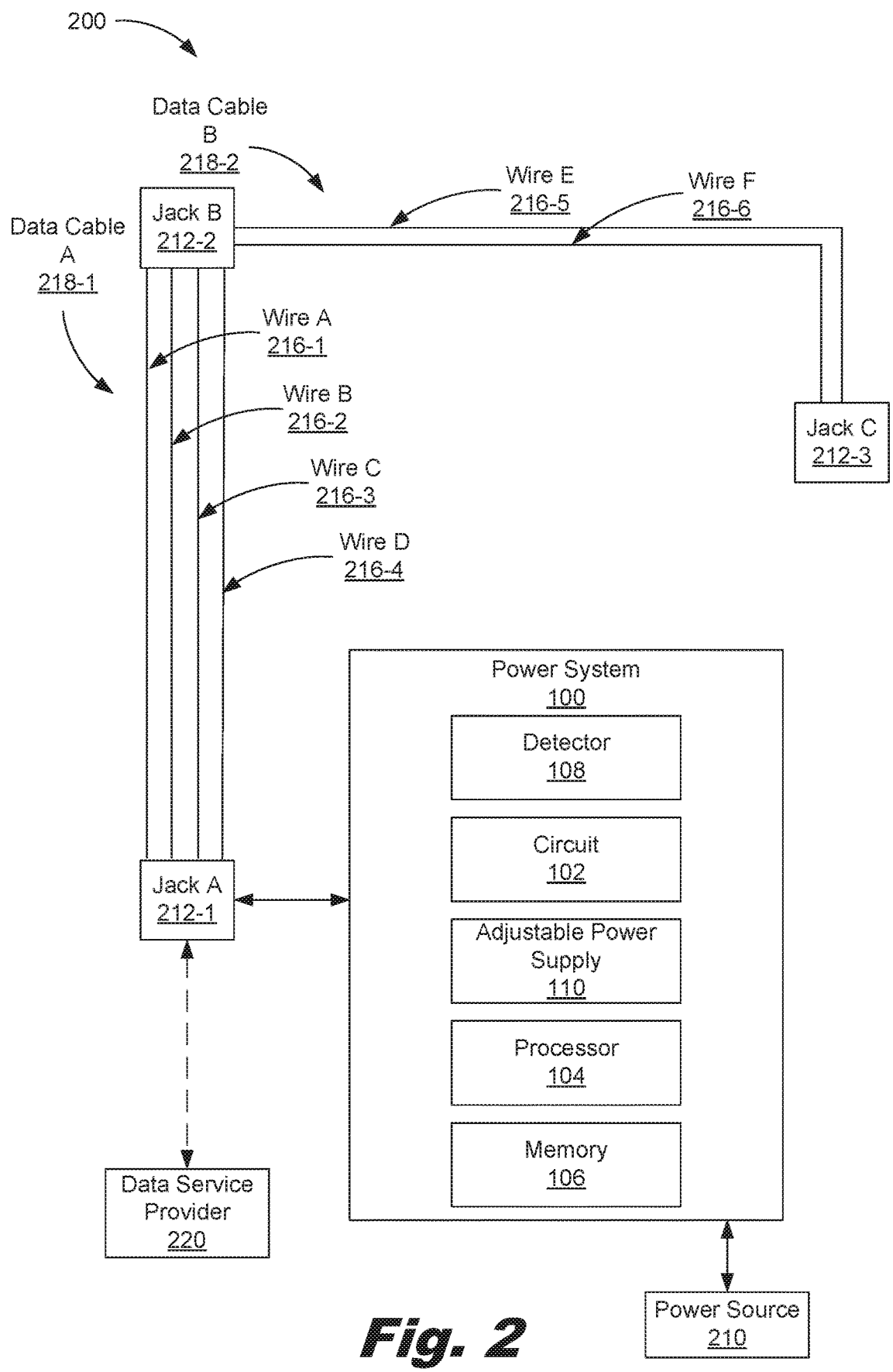
FIG. 2 is a diagram of a system for utilizing an existing data cable infrastructure to provide power, according to one example of principles described herein.

FIG. 2 is a diagram of a system for utilizing an existing data cable infrastructure to provide power, according to one example of principles described herein. As will be described below, a power system is connected to a power source and a primary jack. The power source may power components of the power system. The power system provides an amount of power to the primary jack. The primary jack may distribute that amount of power to secondary jacks.

As illustrated, the system (200) includes a power source (210). As mentioned above, the power source (210) may be a battery, an electric outlet, a solar panel, other power sources, or combinations thereof. The power source (210) may power the components of the power system (100) as described above.

The system (200) includes an existing data cable infrastructure. The existing data cable infrastructure includes a number of jacks (212). For example, the existing data cable infrastructure includes jack A (212-1), jack B (212-2) and jack C (212-3). The jacks (212) may be a standardized telecommunications network interface for connecting voice and data equipment to a data service provider. For example, the jacks (212) may be registered jacks (RJ) for telecommunications. As a result, the jacks (212) may be an RJ11, RJ14, RJ25, RJ45, RJ48, or combinations thereof. In other examples, the jacks (212) may be a coaxial cable jack. The coaxial cable jack may accommodate F connectors. In yet another example, the jacks (212) may be utilized for Ethernet data cables. As a result, the existing data cable infrastructure may include several types of jacks.

In some examples, a jack may be a primary jack that connects a power system (100) to the existing data cable infrastructure. As illustrated, jack A (212-1) is connected to the power system (100). As a result, jack A (212-1) is the primary jack. If jack B (212-2) is connected to the power system (100), jack B (212-2) is the primary jack. If jack C (212-3) is connected to the power system (100), jack C (212-3) is the primary jack.

In some examples, a jack may be a secondary jack. A secondary jack is a jack that is connected to a primary jack. For example, if jack A (212-1) is a primary jack, all other jacks connected directly or indirectly to jack A (211-1) are secondary jacks. As illustrated, since jack B (212-2) and jack C (212-3) are either connected directly or indirectly to jack A (212-1), jack B (212-2) and jack C (212-3) are secondary jacks. As will be described below, jack A (212-1) is directly connected to jack B (212-2) via data cable A (218-1). Jack B (212-2) is directly connected to jack C (212-3) via data cable B (218-2). As a result, jack C (212-3) is indirectly connected to jack A (212-1).

As illustrated, the existing data cable infrastructure includes data cables (218). For example, the existing data cable infrastructure includes data cable A (218-1) and data cable B (218-2). Depending on the type of existing data cable infrastructure, the data cables (218) may be telecommunication data cables for telephones, coaxial cables, or Ethernet cables.

Each of the data cables (218) includes a number of wires (216). As illustrated, data cable A (218-1) includes wire A (216-1), wire B (216-2), wire C (216-3), and wire D (216-4). As a result, data cable A (218-1) may include two pairs of wires. These wires (216-1 to 216-4) within data cable A (218-1) are used to connect jack A (212-1) to jack B (212-2). As a result, data cable A (218-1) is used to connect jack A (212-1) to jack B (212-2).

Data cable B (218-2) includes wire E (216-5) and wire F (216-6). As a result, data cable B (218-2) includes one pair of wires. These wires (216-5 to 216-6) within data cable B (218-2) are used to connect jack B (212-2) to jack C (212-3). In some examples, wire C (216-3) and wire D (216-4) are connected to wire E (216-5) and wire F (216-6) at jack B (212-2). As a result, data cable B (218-2) is used to connect jack B (212-2) to jack C (212-3).

As illustrated, the system (200) includes a power system (100). In some examples, components of the power system (100) may be activated based on an event. For example, when the power system (100) is initially connected to a primary jack and/or a power source (210), the functions of the detector (108) and the circuit (102) may be activated. Once the functions of the detector (108) and circuit (102) are finished, functions of the adjustable power supply (110) may be activated. In other examples, components of the power system (100) may be executed based on a time. For example, functions of the detector (108), the circuit (102), and the adjustable power supply (110) may be activated based on a date, a specific time, a specific time range, other times, or combinations thereof.

As illustrated, the power system (100) is connected to the power source (210) and the primary jack, jack A (212-1). As mentioned above, the power system (100) may be connected to the power source (210) and jack A (212-1) via the input connectors and output connector described above.

As mentioned above, the power system (100) includes the detector (108). The detector (108) detects whether the data cables (218) in the existing data cable infrastructure are being used by a data service provider (220). For example, the data service provider (220) may or may not be connected to jack A (220) as indicated by the dashed lines. When the data service provider (220) is connected to the existing data cable infrastructure via jack A (212-1), there may be a voltage or a dial tone on the existing data cable infrastructure as described above. If there is a voltage or a dial tone on the existing data cable infrastructure, the detector (108) may alert a user that power system (100) cannot be used until the existing data cable infrastructure is not being used by the data service provider (220). The alert may include flashing a red light-emitting diode (LED) associated with the power system (100) or displaying a message on a display of the power system (100). The message may indicate the existing data cable infrastructure is being used by the data service provider (220).

Alternatively, if the detector (108) does not detect the presence of a voltage or a dial tone on the existing data cable infrastructure, the detector (108) may alert a user that the power system (100) can be can supply power the existing data cable infrastructure since the existing data cable infrastructure is not being used by the data service provider (220). The alert may include flashing a green LED associated with the power system (100) or displaying a message on a display of the power system (100). The message may indicate the existing data cable infrastructure is not being used by the data service provider (220).

As mentioned above, the power system (100) includes the circuit (102). The circuit (102) determines an amount of the power that can be provided on each of a number of wires (216) within the data cables (218). The circuit (102) determines the amount of the power that can be provided on each of the number of wires within the data cables by determining if the primary jack of the existing data cable infrastructure is connected to the number of secondary jacks via the wires within the data cables. In some examples a portable device may be connected to each of the secondary jacks. The portable device may be a mechanism that is inserted into the secondary jacks to connect pairs of wires together at each of the secondary jacks. For example, the portable device may be inserted into jack B (212-2) to connect wire A (216-1) and wire B (216-2) together at jack B (212-2). The portable device may connect wire C (216-3) and wire D (216-4) together at jack B (212-2). The portable device may be inserted into jack C (212-3) to connect wire E (216-5) and wire F (216-6) together at jack C (212-3).

Once the portable device is inserted into each of the secondary jacks, the circuit (102) provides a small amount of power, such as 1V, to jack A (212-1). For example, the circuit (102) provides 1V to wire A (216-1) via jack A (212-1) to determine if wire A (216-1) and wire B (216-2) are capable of distributing power. If wire A (216-1) and wire B (216-2) are capable of distributing power, the circuit (102) will receive 1V back via wire B (216-2). Alternatively, if wire A (216-1) and wire B (216-2) are not capable of distributing power, the circuit (102) will not receive 1V back via wire B (216-2). A similar analysis may be conducted for wire C (216-3) wire D (216-4), wire E (216-5), and wire F (216-6).

The circuit (102) determines the amount of the power that can be provided on each of the number of wires within the data cables by determining the number of wires within each of the data cables. In some examples, a user may manually determine the number of wires within each of the data cables (218). In this example, the user may manually identify that data cable A (218-1) has four wires and data cable B (218-2) has two wires. Once the user manually identifies the number of wires within each of the data cables (218), the user may manually select on the power system (100), via a number of input buttons, that data cable A (218-1) has four wires and data cable B (218-2) has two wires. In other examples, the circuit (102) may determine the number of wires in each of the data cables (218) by determining the type of input connector used to connect the power system (100) to the primary jack. For example, if an Ethernet input connector is used to connect the power system (100) to jack A (212-1), the circuit may determine data cables includes eight wires. If a coaxial input connector is used to connect the power system (100) to jack A (212-1), the circuit may determine the data cables includes two wires. If a wired telephone input connector is used to connect the power system (100) to jack A (212-1), the circuit may determine the data cables includes four wires.

The circuit (102) determines the amount of the power that can be provided on each of the number of wires within the data cables by determining a gauge of each of the number of wires within the data cables. In some examples, the amount of power, such as a current or the voltage, may be limited to a specific current and/or voltage such that the wires (216) do not over heat and/or catch fire. The lower the gauge of the wires, the higher the current and/or voltage that can be provided to the wires. In some examples, the type of jack (212) may indicate the gauge of the wires. For example, if jack A (212-1) is connected to data cable A (218-1) and data cable A (218-1) is used as a telephone data cable, the wires within the data cable (218-1) may be 22 gauge or 24 gauge. In another example, if jack A (212-1) is connected to data cable A (218-1) and data cable A (218-1) is a coaxial cable, the wires within the data cable (218) may be 18 gauge. In another example, if jack A (212-1) is connected to data cable A (218-1) and data cable A (218-1) is an Ethernet cable, the wires within the data cable A (218-1) may be 24 gauge.

In other examples, the gauge of each of the number of wires within the data cables may be determined based on a resistance of the wires. For example, to determine the gauge of wire A (216-1) and wire B (216-2), the circuit (102) may provide 1V to wire A (216-1). As mentioned above, the portable device may connect wire A (216-1) to wire B (216-2) at jack B (212-2) such that the circuit may receive a lower voltage from wire B (216-2) due to the resistance of wire A (216-1) and wire B (216-2). Based on the value of the lower voltage, the circuit (102) may determine the resistance and ultimately the gauge of wire A (216-1) and wire B (216-2) via the look up table stored in the memory (106) as described above. A similar analysis may be conducted for wire C (216-3), wire D (216-4), wire E (216-5), and wire F (216-6).

The circuit (102) determines the amount of the power that can be provided on each of the number of wires within the data cables by identifying which of the number of wires within the data cables are capable of distributing the amount of the power to the existing data cable infrastructure. This analysis may be conducted as described above. In an example, wire A (216-1) and wire B (216-2) may be 18 gauge and is capable of distributing 15V to the existing data cable infrastructure. Wire C (216-3) and wire D (216-4) may be 24 gauge and capable of distributing 5V to the existing data cable infrastructure. As a result, 15V is the amount of power that may be distributed to the existing data cable infrastructure via wire A (216-1) and wire B (216-2), and the amount of power that may be distributed to the existing data cable infrastructure via wire C (216-3) and wire D (216-4) is 5V. In this example, the circuit (102) determines wire E (216-5) and wire F (216-6) are not capable of distributing power to the existing data cable infrastructure because wire E (216-5) and/or wire F (216-6) may not fully be connected to either jack B (212-2) or jack C (212-3).

As mentioned above, the power system (100) includes the adjustable power supply (110). The adjustable power supply (110) selectively provides the power over the wires (216) within the data cables (218) in the amount determined by the circuit (102) and based on whether the detector (108) determines the data cables (218) to be in use by the data service provider (220).

In an example, the amount of the power that is selectively provided to the wires of the data cables via the adjustable power supply (110) of the power system (100) is customizable. For example, if up to 15V can be provided to wire A (216-1) and wire B (216-2), the user may select 5V, 10V or 15V is to be provided to wire A (216-1) and wire B (216-2). In this example, the power system (100) may include a display, buttons, or potentiometers to allow the user to select the amount of power. For example, the display may indicate wire A and wire B may support up to 15 V. The user may then use the buttons or the potentiometers to select an amount of power ranging between 0 to 15V. This may include scrolling, via the display, through power options and allowing the user to select an option. Once the user selects the amount of power, the adjustable power supply (110) provides that amount of power on wire A (216-1) and wire B (216-2). Similarly, the user may customize the amount of power for each of the other wires (216-3 to 216-6) in the existing data cable infrastructure.

In some examples, the adjustable power supply (110) of the power system (100), limits the amount of the power selectively provided to each of the wires (216) within the data cables (218) based on a gauge of each of the wires (216) as described above.

In another example, the adjustable power supply (110) may adjust the amount of power based on the type of user device that is connected to the secondary jacks. For example, if a laptop is connected to jack B (212-2), the circuit (102) may detect that a laptop is connected to jack B (212-2) and the adjustable power supply (110) may provide 19.5V via wire A (216-1) and wire B (216-2) if wire A (216-1) and wire B (216-2) are capable of providing up to 19.5V.

Further, the adjustable power supply (110) provides the amount of the power to the primary jack and the primary jack distributes the amount of the power to each of the secondary jacks via the wires within the data cables. For example, if 5V is provided to jack A (212-1), 5V is distributed from jack A (212-1) to jack B (212-2) and jack C (212-3) via the wires (216) in the data cables (218).

Once the amount of power is provided to the primary jack, a user may plug an electronic device into a secondary jack. For example, if jack B (212-2) is an RJ11 jack, the user may connect the electronic device to jack B (212-2) via a cable or an adaptor. The cable may include an RJ11 connector on one side of the cable to connect the cable to jack B (212-2). The cable may include a universal serial bus (USB) connector on the other side of the cable to connect the cable the electronic device. As a result, the jacks (212) may act as power outlets for charging electronic devices.

Figure 3:
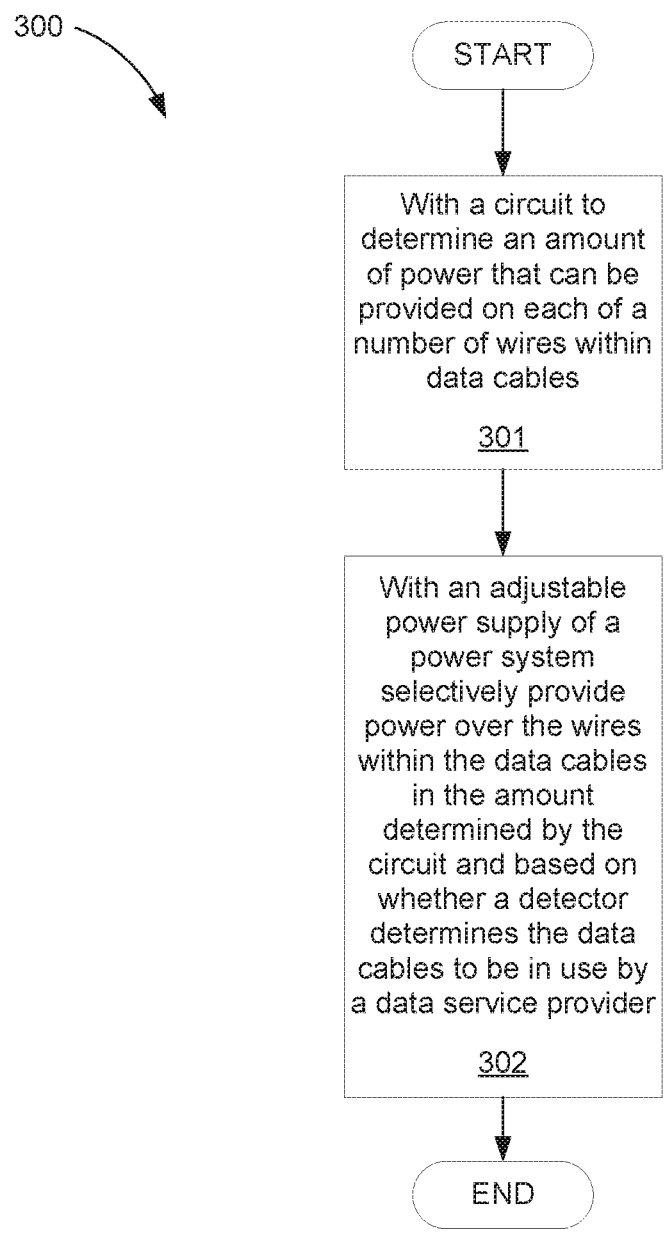
FIG. 3 is a flowchart of a method for utilizing an existing data cable infrastructure to provide power, according to one example of principles described herein.

FIG. 3 is a flowchart of a method for utilizing an existing data cable infrastructure to provide power, according to one example of principles described herein. The method (300) may be executed by the power system (100) of FIG. 1A. The method (300) may be executed by other systems such as the power system 100 of FIG. 1B or system 200. The method (300) includes with a circuit determining (301) an amount of the power that can be provided on each of a number of wires within data cables and with an adjustable power supply of a power system selectively providing (302) the power over the wires within the data cables in the amount determined by the circuit and based on whether the detector determines the data cables to be in use by a data service provider.

As mentioned above, the method (300) includes with a circuit determining (301) an amount of the power that can be provided on each of a number of wires within data cables. As mentioned above, the amount of power that can be provided on each of the wires within data cables may be limited based on the gauge of the wires. As a result, if the wires of the data cables are different gauges, different amounts of power can be provided on each of a number of wires within data cables. For example, if the data cable includes two pairs of wires and the first pair of wires is 12 gauge and the second pair of wires is 24 gauge, the method (300) may provide one amount of power on the first pair of wires and a different amount of power on the second pair of wires.

As mentioned above, the method (300) includes with an adjustable power supply of a power system selectively providing (302) the power over the wires within the data cables in the amount determined by the circuit and based on whether the detector determines the data cables to be in use by a data service provider. For example, if a maximum of 15V may be provided on a first pair of wires of a data cable, the adjustable power supply may provide up to 15V on the first pair of wires if the detector determines the data cables are not in use by a data service provider. If the data cables are in use by a data service provide, the method (300) does not supply the power to the first set of wires. In keeping with the example, if a maximum of 5V may be provided on a second pair of wires, the adjustable power supply may provide up to 5V on the second pair of wires if the detector determines the data cables are not in use by a data service provider. If the data cables are in use by a data service provide, the method (300) does not supply the power to the second pair of wires.

In some examples, the amount of power may be an AC voltage or a DC voltage. The AC voltage may be a sinusoidal waveform, a square waveform, or other waveforms.

While this example has been described with reference to a specific voltage being provided via the power system, a specific current may be provided by the power system. For example, based on the gauge of the wire, the electronic device, or other factors a specific current such as 1000 milliamps (mA) may be provided by the power system.

Figure 4:
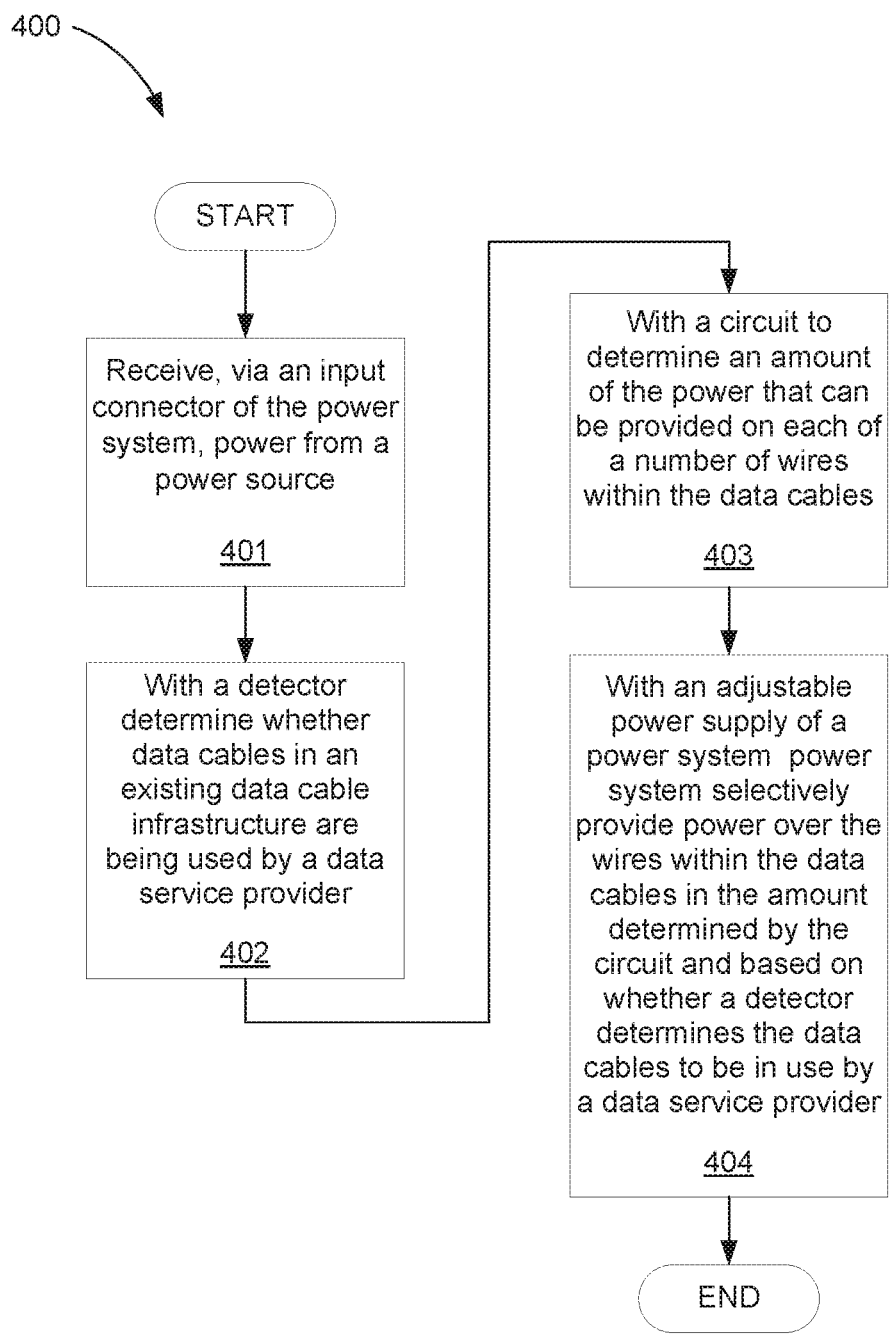
FIG. 4 is a flowchart of a method for utilizing an existing data cable infrastructure to provide power, according to one example of principles described herein.

FIG. 4 is a flowchart of a method for utilizing an existing data cable infrastructure to provide power, according to one example of principles described herein. The method (400) may be executed by the power system (100) of FIG. 1A. The method (400) may be executed by other systems such as the power system 100 of FIG. 1B or system 200. The method (400) includes receiving (401), via an input connector of the power system, power from a power source, with a detector detecting (402) whether the data cables in the existing data cable infrastructure are being used by a data service provider, with a circuit determining (403) an amount of the power that can be provided on each of a number of wires within data cables and with a power system selectively provide (404), via an adjustable power supply, the power over the wires within the data cables in the amount determined by the circuit and based on whether the detector determines the data cables to be in use by a data service provider.

As mentioned above, the method (400) includes receiving (401), via an input connector of the power system, power from a power source. The power source may be a mechanism used to supply power to the power system. The power supplied to the power supply may be used to provide power to the components of the power system. For example, the power source may provide power to the detector, the circuit, the adjustable power supply, other components, or combinations thereof. In an example, the power source may be a DC power source such as a battery. The battery may be a 9V battery or a custom battery designed to provide power to the components of the power system.

The power supply may be an electric outlet. The electric outlet may provide the power system with 110V AC. In some examples, the power supply may include electrical components to convert the 110V AC to a lower DC voltage. The electrical components may include transformers, rectifiers, and capacitors designed to produce a specific DC voltage.

The power supply may be a solar panel. The solar panel may be capable of providing the power system with a specific DC voltage.

As mentioned above, the method (400) includes with a detector detecting (402) whether the data cables in the existing data cable infrastructure are being used by a data service provider. In some examples, the method (400) may detect which of the wires in the data cables are being used by the data service provider. For example, if the data cables include four wires, the detector may analyze each of the wires to determine whether the data cables in the existing data cable infrastructure are being used by the data service provider as described above.

In some examples, if at least two wires in a data cable are not being used by the service provider, the method (400) may determine to use these two wires not being used by the data service provider to provide power. In other examples, if any of the wires in the data cable are being used by the service provider, the method (400) may determine to not to use any of the wire to provide power.

The preceding description has been presented to illustrate and describe examples of the principles described. This description is not intended to be exhaustive or to limit these principles to any precise form disclosed. Many modifications and variations are possible in light of the above teaching.

What is claimed is:

1. A system for utilizing a data cable infrastructure to provide power, the system comprising:
   a detector to determine that data cables in the data cable infrastructure are not being used by a data service provider;
   a circuit, comprising a processor, to determine an amount of power that can be provided on each of a number of wires within the data cables that are not being used by the data service provider, wherein the processor measures a resistance to determine a gauge of the number of wires; and
   a power system with an adjustable power supply to selectively provide power over the wires within the data cables in the amount determined by the circuit, wherein the power system provides a first voltage on a first pair of wires of the number of wires within the data cable, and the power system provides a second, different voltage on a second pair of wires of the number of wires within the data cable,
   wherein the power system selectively provides the power over the wires within the data cables in the amount determined by the circuit and based on whether the detector determines the data cables to be in use by the data service provider by: limiting, via the adjustable power supply of the power system, the amount of the power provided to each of the wires within the data cables based on the gauge of each of the wires; and providing the amount of the power to a primary jack of the data cable infrastructure, the primary jack distributing the amount of the power to secondary jacks associated with the data cable infrastructure via the wires within the data cables.

2. The system of claim 1, wherein the data cable infrastructure comprises a primary jack, a number of secondary jacks, and the data cables, the wires of the cables connecting the primary jack and the secondary jacks to each other to allow the power system to selectively provide the amount of the power to the primary jack, the primary jack distributing the amount of the power to each of the secondary jacks.

3. The system of claim 1, wherein the amount of the power that is selectively provided to the wires of the data cables via the power system is customizable.

4. The system of claim 1, wherein the circuit determines the amount of the power that can be provided on each of the number of wires within the data cables by: determining when a primary jack of the data cable infrastructure is connected to a number of secondary jacks via the wires within the data cables; determining the number of wires within each of the data cables; determining a gauge of each of the number of wires within the data cables; and identifying which of the number of wires within the data cables are capable of distributing the amount of the power to the data cable infrastructure.

5. The system of claim 1, further comprising an input connector of the power system to receive the power from a power source.

6. The system of claim 1, further comprising:
   a secondary jack connected to a primary jack with the wires within the data cable; and
   a connection cable connected to the secondary jack.

7. A system for utilizing a data cable infrastructure to provide power, the system comprising:
   a power source;
   a data cable infrastructure, the data cable infrastructure comprises a primary jack; and
   a power system connected to the power source and the primary jack, the power system comprising: a processor;
   a detector to detect the data cables in the data cable infrastructure that are not being used by a data service provider;
   a circuit to determine an amount of power that can be provided on each of a number of wires within the data cables not being used by the data service provider, and an adjustable power supply to selectively provide power over the wires within the data cables not being used by the data service provider in the amount determined by the circuit;
   wherein the adjustable power supply provides a first voltage on a first pair of wires of the number of wires within the data cable, and the adjustable power supply provides a second, different voltage on a second pair of wires of the number of wires within the data cable,
   wherein the power system selectively provides the power over the wires within the data cables in the amount determined by the circuit and based on whether the detector determines the data cables to be in use by the data service provider by: limiting, via the adjustable power supply of the power system, the amount of the power provided to each of the wires within the data cables based on the gauge of each of the wires; and providing the amount of the power to a primary jack of the data cable infrastructure, the primary jack distributing the amount of the power to secondary jacks associated with the data cable infrastructure via the wires within the data cables.

8. The system of claim 7, wherein the amount of the power that is selectively provided to the wires of the data cables via the power system is customizable.

9. The system of claim 7, wherein the circuit determines the amount of the power that can be provided on each of the number of wires within the data cables by: determining when the primary jack of the data cable infrastructure is connected to a number of secondary jacks via the wires within the data cables; determining the number of wires within each of the data cables; determining a gauge of each of the number of wires within the data cables; and identifying which of the number of wires within the data cables are capable of distributing the amount of the power to the data cable infrastructure.

10. The system of claim 7, further comprising a connection cable connected to the secondary jack, the connection cable ending in a universal serial bus (USB) connector.

11. A method for utilizing a data cable infrastructure comprising data cables to provide power, the method comprising:
with a detector, determining which data cables in the data cable infrastructure are not being used by a data service provider;
with a circuit comprising a processor, determining with the processor an amount of power that can be provided on each of a number of wires within data cables of the infrastructure not being used by the data service provider; and with an adjustable power supply of a power system, selectively providing power over the wires within the data cables in the amount determined by the circuit, wherein the adjustable power supply provides a first voltage on a first pair of wires of the number of wires within the data cable, and the adjustable power supply provides a second, different voltage on a second pair of wires of the number of wires within the data cable;
wherein the power system selectively provides the power over the wires within the data cables in the amount determined by the circuit and based on whether the detector determines the data cables to be in use by the data service provider by: limiting, via the adjustable power supply of the power system, the amount of the power provided to each of the wires within the data cables based on the gauge of each of the wires; and providing the amount of the power to a primary jack of the data cable infrastructure, the primary jack distributing the amount of the power to secondary jacks associated with the data cable infrastructure via the wires within the data cables.

12. The method of claim 11, further comprising selectively providing power over the wires that are not being used by the data service provider.

13. The method of claim 11, wherein the circuit determines the amount of the power that can be provided on each of the number of wires within the data cables by: determining when a primary jack of the data cable infrastructure is connected to a number of secondary jacks via the wires within the data cables; determining the number of wires within each of the data cables; determining a gauge of each of the number of wires within the data cables; and identifying which of the number of wires within the data cables are capable of distributing the amount of the power to the data cable infrastructure.

14. The system of claim 1, further comprising:
a primary jack connected to a secondary jack with the wires within the data cables.

15. The method of claim 11, wherein a secondary jack is connected to a primary jack via the wires within the data cables and further comprising cross-connecting wires at the secondary jack to produce a loop to measure resistance of the wires.

16. The method of claim 11, wherein a primary jack is connected to a secondary jack with the wires within the data cable; and further comprising attaching a portable device to each secondary jack, wherein the portable device electrically cross-connects wires in the secondary jack to allow measurement of the resistance of the wires.

17. The method of claim 11, wherein a primary jack is connected to a secondary jack with the wires within the data cable; and further comprising connecting a USB connector to the secondary jack.

* * * * *